United States Patent
Balamucki

(10) Patent No.: US 7,069,806 B2
(45) Date of Patent: Jul. 4, 2006

(54) TRANSMISSION AUXILIARY BOX SEAL SYSTEM

(75) Inventor: Thomas Balamucki, Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 202 days.

(21) Appl. No.: 10/393,141

(22) Filed: Mar. 20, 2003

(65) Prior Publication Data
US 2004/0182192 A1   Sep. 23, 2004

(51) Int. Cl.
*B60K 17/10* (2006.01)

(52) U.S. Cl. .................... 74/473.11; 277/353

(58) Field of Classification Search ........... 74/473.11; 277/349, 350, 353, 361
See application file for complete search history.

(56) References Cited

U.S. PATENT DOCUMENTS

| | | | |
|---|---|---|---|
| 5,833,245 A * | 11/1998 | Gallagher | 277/549 |
| 5,992,948 A * | 11/1999 | Gowda | 303/116.1 |
| 6,484,600 B1 * | 11/2002 | Bennett et al. | 74/473.11 |
| 6,722,658 B1 * | 4/2004 | Siegrist et al. | 277/436 |
| 6,766,710 B1 * | 7/2004 | Reul et al. | 74/473.11 |

* cited by examiner

*Primary Examiner*—David Fenstermacher
(74) *Attorney, Agent, or Firm*—Carlson, Gaskey & Olds

(57) ABSTRACT

The present invention provides a transmission including a main gear box and an auxiliary gear box secured to the main box. The auxiliary gear box includes an auxiliary shaft supporting an auxiliary gear with a clutch collar support on the auxiliary shaft adjacent to the auxiliary gear. The clutch collar is selectively actuatable between engaged and disengaged auxiliary gear positions. A piston housing is connected to the auxiliary gear box and supports solenoids fluidly connected to a piston on a shift shaft. The auxiliary box includes a bore therein supporting the shift shaft. The shift shaft is moveable axially between first and second positions in response to actuation of the solenoids corresponding to the engage and disengaged auxiliary gear positions. The shift shaft supports a shift fork that coacts with the shift collar. The shirt shaft includes an annular groove and a seal is arranged in the annular groove between the auxiliary box housing and the shift shaft for separating transmission fluid from actuating fluid within the piston.

7 Claims, 2 Drawing Sheets large number of gears through which the vehicle operator shifts as the vehicle travels under various load and grade conditions. The transmission may be manual or automated manual. A typical commercial vehicle transmission includes a main gear box through which the operator shifts using a transmission shift lever. An auxiliary gear box is attached to the main gear box to provide gear ratios in addition to those provided by the main gear box. The gears of the auxiliary gear box may be shifted with hydraulic or pneumatic actuators in response to the vehicle operator manipulating electronic buttons or switches in the vehicle cab.

For auxiliary gear boxes utilizing pneumatic actuators, a piston housing is secured to the auxiliary gear box. Solenoids are connected to the piston housing and control the flow of air into the piston housing to drive a piston. The actuator includes a shift shaft with the piston secured thereto. The piston disposed within an air chamber. The shift shaft is supported by the auxiliary gear box, and the piston may be arranged in either the auxiliary gear box or piston housing. The solenoids control the flow of air to either side of the piston to move the shift shaft axially. The shift shaft includes a shift fork supported thereon which engages a clutch collar in the auxiliary gear box that selectively engages the auxiliary gears in response to axial movement of the piston.

A seal is used between the shift shaft and auxiliary box housing to separate the pressurized air within the air chamber and the transmission oil within the auxiliary gear box. An annular groove is machined into the bore of the auxiliary box housing supporting the shift shaft. Typically, an O-ring is arranged within the annular groove. Because the annular groove is located within the bore, it is difficult to machine. Moreover, the O-ring may not provide an acceptable seal. Therefore, what is needed is an improved seal system for an auxiliary gear box housing that is easier to machine and provides a more effective seal.

SUMMARY OF THE INVENTION

The present invention provides a transmission including a main gear box and an auxiliary gear box secured to the main box. The auxiliary gear box includes an auxiliary shaft supporting an auxiliary gear with a clutch collar support on the auxiliary shaft adjacent to the auxiliary gear. The clutch collar is selectively actuatable between engaged and disengaged auxiliary gear positions. A piston housing is connected to the auxiliary gear box and supports solenoids fluidly connected to a piston on a shift shaft. The piston housing includes a bore supporting the shift shaft. The shift shaft is moveable axially between first and second positions in response to actuation of the solenoids corresponding to the engage and disengaged auxiliary gear positions. The shift shaft supports a shift for that coacts with the shift collar. The shift shaft includes an annular groove, and a seal is arranged in the annular groove between the Piston housing and the shift shaft for separating transmission fluid from actuating fluid within the piston.

Accordingly, the above invention provides an improved seal system for an auxiliary gear box that is easier to machine while providing a more effective seal.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
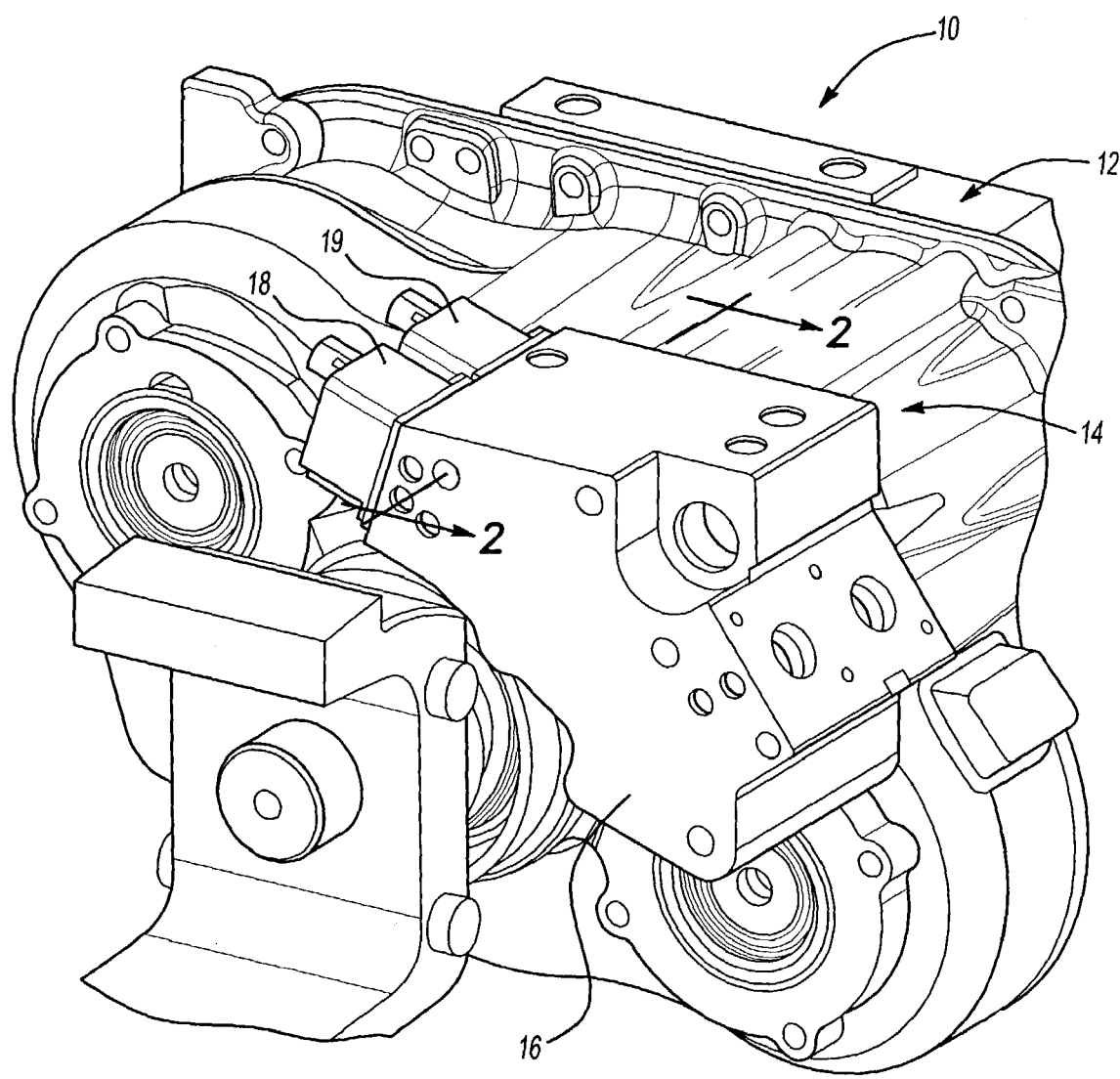
FIG. 1 is a perspective end view of a commercial vehicle transmission having an auxiliary gear box.

A transmission 10 is shown in FIG. 1. A commercial vehicle transmission 10 typically includes a main gear box 12 and an auxiliary gear box 14 secured to the main gear box 12. The main gear box 12 provides gears that, when shifted by the shift lever, provide a large number of gear ratios. The transmission 10 may be a manual or automated manual transmission. Additional gear ratios are provided by manipulating the auxiliary gear box 14, which "splits" or extends the "range" of the gear ratios provided by the main gear box 12.

Figure 2:
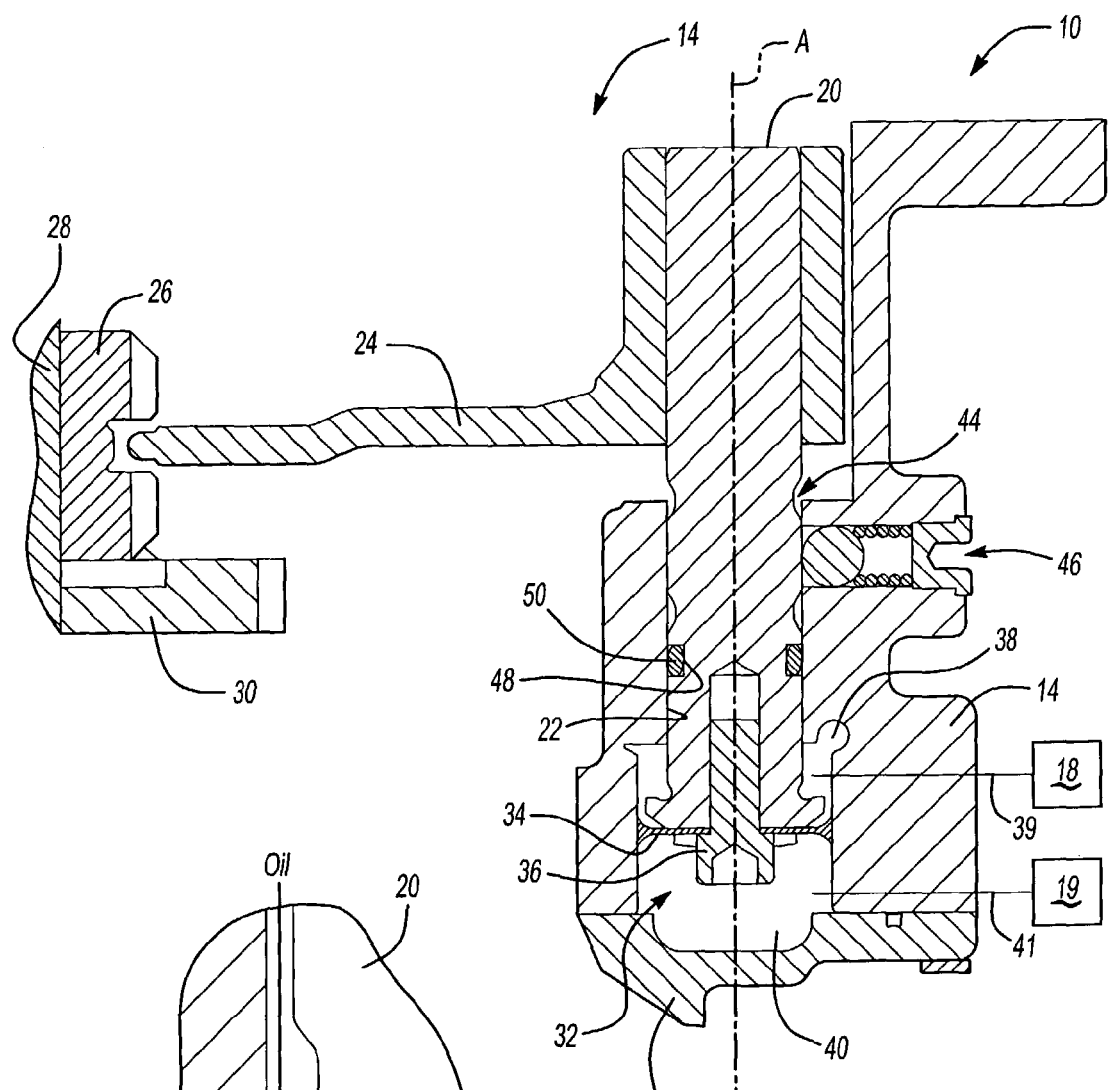
FIG. 2 is a cross-sectional view of the auxiliary gear box and piston housings taken along line 2—2 of FIG. 1.

The auxiliary gear box 14 also may be automated by utilizing hydraulic or pneumatic actuators. For such an automated system, a piston housing 16 is secured to the auxiliary gear box 14. Solenoids 18 and 19 are supported on the piston housing 16 and selectively provide a pressurized fluid to the piston housing 16 for shifting the gears of the auxiliary gear box 14. Referring to FIG. 2, a shift shaft 20 is supported within a bore 22 of the piston housing 16. A shift fork 24 is supported on the shift shaft 20 and engages a clutch collar 26. As is known in the art, the clutch collar 26 is supported on an auxiliary gear shaft 28 and is moved to selectively engage an auxiliary gear 30. The shift shaft 20 is actuated along an axis A to engage and disengage the clutch collar 26 (tom the auxiliary gear 30.

A splitter shaft is shown in FIG. 2. The shift shaft 20 has an end arranged within an air chamber 32, which is defined by the piston housing 16 for a splitter shaft arrangement. For the range shaft, the air chamber may be defined by the piston housing for easier machining and assembly. The end of the shaft 20 has a piston 34 secured thereto by a fastener 36 to divide the chamber 32 into first 38 and second 40 cavities. The solenoids 18, 19 regulate the flow of fluid into the cavities 38, 40 through first 39 and second 41 passages, respectively. The piston housing 16 is secured to the auxiliary box housing 14 by fasteners (not shown). The shift shaft 20 moves axially along axis A in response to changes in the pressures in the cavities 38, 40 regulated by the solenoids 18, 19. The shift shaft 20 may be held in a desired position by a detent assembly 46.

Figure 3:
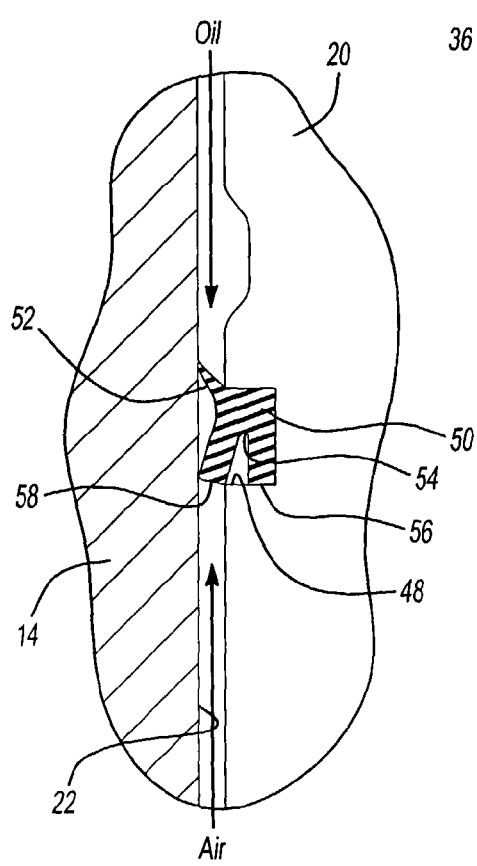
FIG. 3 is an enlarged cross-sectional view of the shift shaft shown in FIG. 2.

In the prior art, the air chamber 32 was sealed from the interior of the auxiliary gear box 14 by an O-ring arranged in an annular groove machined in the auxiliary box housing bore 22. The groove was difficult to machine since it was located interiorly of the end of the bore 22, which make it difficult to position a machining tool. Moreover, the 0-ring provided an insufficient seal between the pressurized air chamber 32 and the transmission fluid within the auxiliary gear box 14. To this end, the present invention provides an annular groove 48 machined onto the shift shaft 20. A seal 50 is arranged in the annular groove 48, as best shown in FIG. 3.

The annular groove 48 may be easily machined onto the shift shaft and the seal 50 installed thereon. The shift shaft 20 With the seal 50 may then be inserted into the bore 22. Preferably, a lip seal is arranged in the annular groove 48. A lip seal includes a wiper 52 that extends to the bore 22 to scrape oil from the bore 22 as the shift shaft 20 moves axially thereby preventing it from entering the air chamber 32. Opposite the wiper 52, the seal 50 may include a notch 54 defining opposing walls 56 and 58. Pressurized fluid in the notch 54 forces the opposing walls 56, 58 outwardly away from one another to create a seal between the shaft 20 and auxiliary box housing 14 to better retain the pressurized fluid within the air chamber 32.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

The invention claimed is:

1. A transmission comprising:
a main gear box;
an auxiliary gear box secured to said main gear box including an auxiliary shaft supporting at least one auxiliary gear, and a clutch collar supported on said auxiliary shaft adjacent to the at least one auxiliary gear, and selectively actuatable between engaged and disengaged auxiliary gear positions; a piston movable within a piston chamber, and controls for supplying pressurized fluid to at least one side of said piston and into said piston chamber, a bore being defined to support a shift shaft which is connected to move with said piston, said piston having a greater diameter than said shift shaft;
a transmission fluid received within said auxiliary gear box;
said shift shaft movable axially with said piston between first and second positions, said first and second positions corresponding to the engaged and disengaged auxiliary gear positions, said shift shaft supporting a shift fork that engages said clutch collar, said shift shaft having an annular groove; and
a seal disposed in said annular groove for engaging said bore and said shift shaft, and for separating said transmission fluid from said pressurized fluid.

2. The transmission according to claim 1, wherein said seal is a lip seal.

3. The transmission according to claim 2, wherein said lip seal includes a wiper and a notch opposite said wiper defining opposing walls.

4. The transmission according to claim 3, wherein said wiper faces in a direction away from said piston for scraping said transmission fluid from said bore.

5. The transmission according to claim 1, wherein said pressurized fluid is air.

6. The transmission according to claim 1, wherein said pressurized fluid is selectively directed into said piston chamber on both sides of said piston.

7. The transmission according to claim 6, wherein solenoids control flow of said pressurized fluid into said piston chamber.

* * * * *